United States Patent [19]
Duesterhoeft

[11] Patent Number: 5,863,212
[45] Date of Patent: *Jan. 26, 1999

[54] MEMORY CARD CONNECTOR HAVING REDUCED TRANSVERSE DIMENSION

[75] Inventor: Scott S. Duesterhoeft, Etters, Pa.

[73] Assignee: Berg Technology, Inc., Reno, Nev.

[*] Notice: This patent issued on a continued prosecution application filed under 37 CFR 1.53(d), and is subject to the twenty year patent term provisions of 35 U.S.C. 154(a)(2).

[21] Appl. No.: 624,266

[22] Filed: Mar. 29, 1996

[51] Int. Cl.⁶ .................................................. H01R 13/62
[52] U.S. Cl. ............................................................ 439/160
[58] Field of Search ...................................... 439/152–160

[56] References Cited

U.S. PATENT DOCUMENTS

| | | | |
|---|---|---|---|
| 4,026,014 | 5/1977 | Kazuyasu et al. | 29/629 |
| 4,952,161 | 8/1990 | Komatsu | 439/155 |
| 5,026,296 | 6/1991 | Hashiguchi | 439/159 |
| 5,145,389 | 9/1992 | Okubo | 439/152 |
| 5,152,697 | 10/1992 | Abe et al. | 439/152 |
| 5,197,894 | 3/1993 | Koiki | 439/159 |
| 5,286,214 | 2/1994 | Takahashi | 439/159 |

FOREIGN PATENT DOCUMENTS 0 547 255 A1  12/1991  European Pat. Off. ...... H01R 13/633

*Primary Examiner*—Gary Paumen
*Assistant Examiner*—Tho Dac Ta
*Attorney, Agent, or Firm*—Daniel J. Long; M. Richard Page

[57] ABSTRACT

A connector apparatus for receiving a card-like data processing medium in a frame element having a rear transverse element and a pair of longitudinal elements. A header is disposed adjacent the rear element of the frame member and an actuator bar for moving the card-like data processing medium out of engagement with the header is provided. An eject plate is moved by a link arm connected to the frame at a pivot point. The actuator bar is positioned below or above one of the longitudinal elements of the frame to significantly reduce the transverse dimension of the connector.

9 Claims, 8 Drawing Sheets

MEMORY CARD CONNECTOR HAVING REDUCED TRANSVERSE DIMENSION

BACKGROUND OF THE INVENTION

1. Field of the Invention

The present invention relates to electrical connectors and more particularly to electrical connectors for computer memory cards.

2. Brief Description of Prior Developments

Memory cards are conventionally connected to computers by means of connectors comprising a frame member which will have a transverse rear element and a pair of longitudinal elements having opposed card receiving grooves on their inner surfaces. A connector header is positioned adjacent the transverse rear element, and the memory card is inserted between the side elements of the frame and then engaged with the header. The connector also includes an eject mechanism which conventionally may be an eject plate which is positioned directly beneath the rear transverse element of the frame. An ejector actuator bar is positioned laterally adjacent to one of the longitudinal elements of the frame and extends rearwardly to be connected by a pin to one end of an eject arm. The eject arm is at its other end connected to the eject plate and is medially connected by a fulcrum pin to both the eject plate and the rear transverse section of the frame. When the user applies inward longitudinal pressure to the actuator bar, the arm pivots on the fulcrum pin to move the ejector plate forward against the rear end of the memory card so as to move it out of engagement with the connector header. A disadvantage to such memory card ejection systems exists in that the actuator bar occupies a significant amount of space to the side of the longitudinal element against which it is positioned. The overall transverse dimension of the memory card connector is thus correspondingly increased, and efforts to decrease the size of computers employing such memory card connectors are impeded. A need, therefore, exists for a memory card connector actuator bar arrangement which does not substantially add to the transverse dimension of the memory card connector.

SUMMARY OF THE INVENTION

The memory card connector of the present invention comprises a frame having a rear transverse element and opposed longitudinal elements. The longitudinal elements extend forward from said rear transverse element and are spaced at an interval substantially equal to the width of the memory card. The opposing side elements define a storage space, and one end of said frame defines an insertion inlet for inserting the memory into the storage space. The opposed longitudinal elements are positioned in parallel planes and the memory card s positioned in a plane perpendicular to said longitudinal element planes. A header is positioned adjacent the rear transverse element of the frame opposite the insertion inlet. An eject plate is movably mounted on the frame and is operable to slide away from the header to eject the card-like electronic medium. A link arm is pivotally connected to the frame and has an eject plate engagement means for moving the eject plate away from the header to eject the memory card. An elongated activator means such as an elongated bar for pivoting said link arm is provided to move the eject plate and the memory card away from the header. Unlike conventional activator bars which are positioned to the side of one of the longitudinal frame elements, the activator in the memory card connector of this invention is positioned in a common vertical plane either above or below one of the longitudinal element.

Specifically encompassed within the present invention are both memory card connector arrangements in which the elongated activation means is superimposed over part or all of the connector frame and in which part or all of the frame is superimposed over the elongated activation means because the activator means is positioned in this way, the transverse dimension of the connector may be reduced substantially.

Also encompassed within the present invention is a method of operating a connector for receiving a card-like data processing medium in a frame element having a rear transverse apparatus element and a pair of spaced longitudinal elements which are positioned in parallel planes. In this method a link arm moves on a pivot point on the frame to move an eject plate to move the card-like data processing medium out of engagement with the header. An elongated activation means is positioned in one of the longitudinal element planes and is moved longitudinally in that plane to pivot the link arm.

The term "memory card" as used herein includes any type I, type II or type III Personal Computer Memory Card International Association (PCMCIA) card as well as any other card which may be used in any type of computer system to perform a similar function.

BRIEF DESCRIPTION OF THE DRAWINGS

The invention is further described with reference to the accompanying drawings in which.

DETAILED DESCRIPTION OF THE PREFERRED EMBODIMENTS

Figure 1:
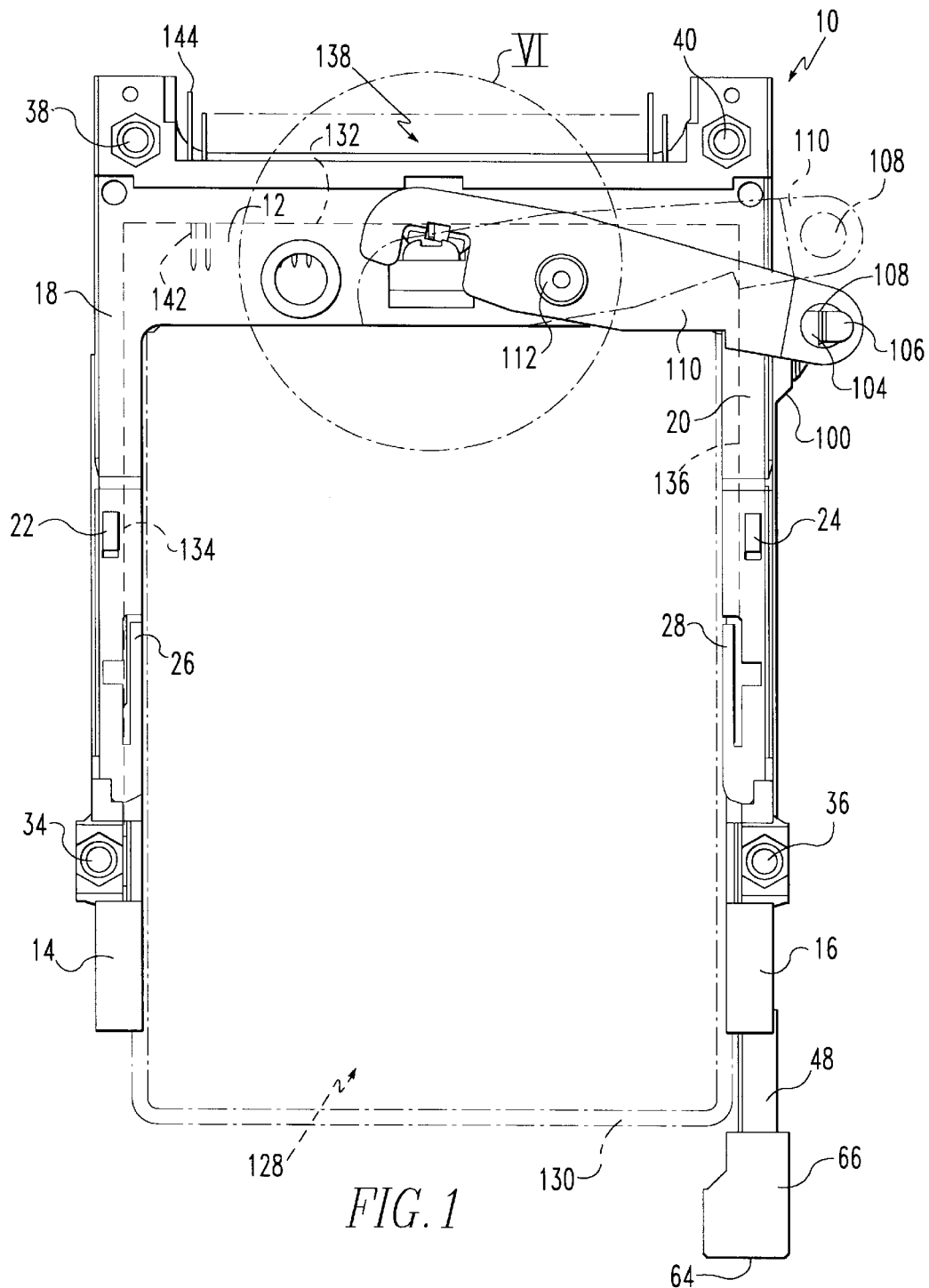
FIG. 1 is a top plan view of a memory card connector representing a preferred embodiment of the present invention.
Figure 2:
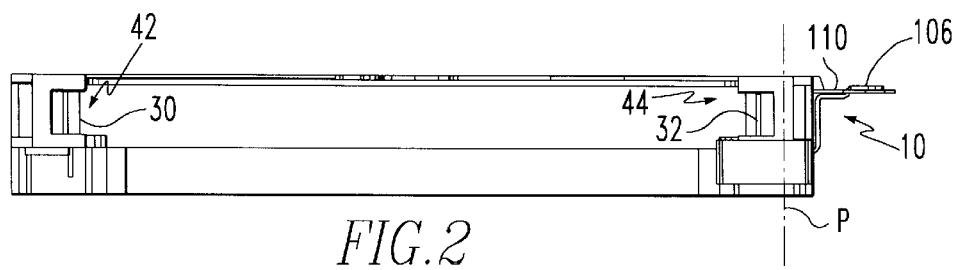
FIG. 2 is an end view of the memory card connector shown in FIG. 1.
Figure 3:
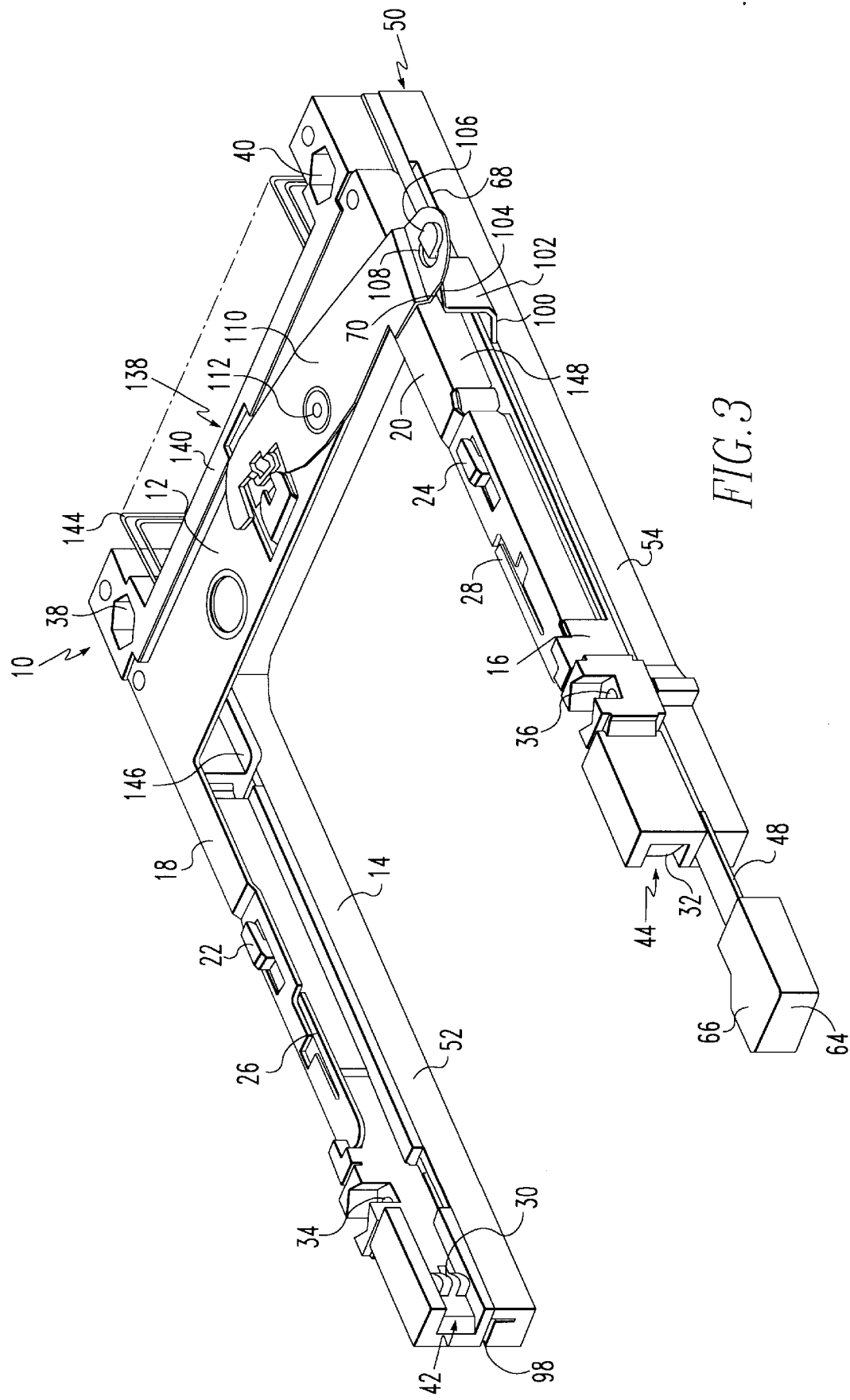
FIG. 3 is a top perspective view of the memory card connector shown in FIG. 1.
Figure 4:
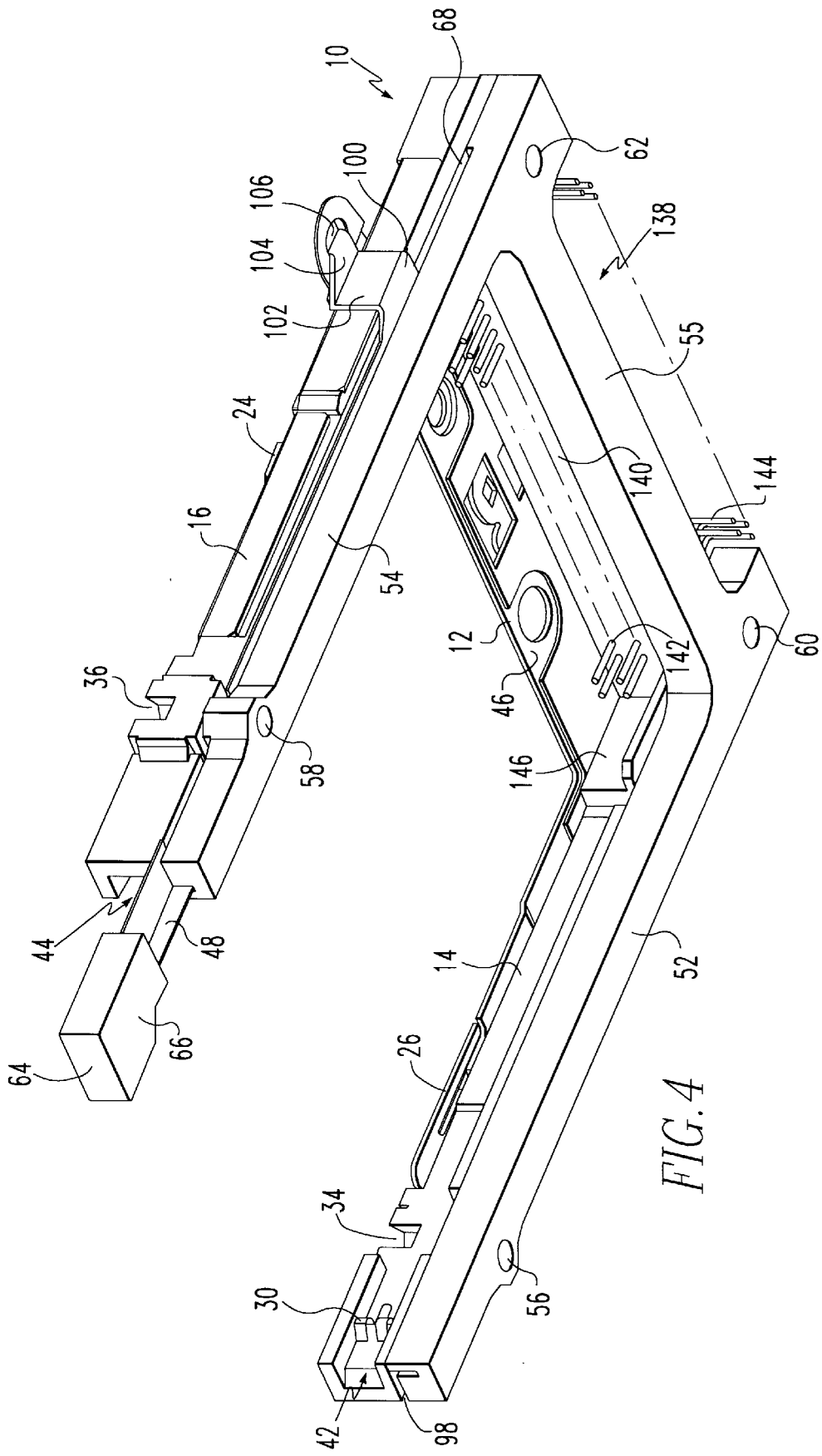
FIG. 4 is a bottom perspective view of the memory card connector shown in FIG. 1.

Referring to FIGS. 1–6, the memory card and connector assembly of the present invention includes a frame member shown generally at numeral 10. This frame member is made up of a metallic rear transverse element 12 and two plastic longitudinal elements 14 and 16. The rear transverse element has metal extensions 18 and 20 which extend perpendicularly therefrom to be connected to the longitudinal elements by means of clips respectively at 22 and 24. On the longitudinal elements 14 and 16 there are also electrostatic discharge (ESD) contacts respectively at 26 and 28 and electromagnetic interference (EM) contacts respectively at 30 and 32. There are also front apertures respectively at 34 and 36 through these two longitudinal elements which with rear apertures 38 and 40 in the header as is explained below will be used to connect the assembly to a printed wiring board. There are also side grooves 42 and 44 in the two longitudinal elements which serve to retain the memory card between those elements. It will also be seen that there is also a card engagement plate 46 immediately beneath the rear transverse element of the frame. There is an activator bar 48 which allow longitudinal sliding motion of the activator bar. There is also a spacer member shown generally at 50 over which the frame member 12 is superimposed. The spacer member includes longitudinal elements 52 and 54 which are positioned respectively beneath frame member longitudinal elements 14 and 16 and transverse member 55 which is positioned beneath transverse element 12 of the frame member so that the actuator bar and the longitudinal element 16 are generally in a common vertical plane P (FIG. 2). The spacer also has mounting apertures 56, 58, 60 and 62 which are aligned respectively with apertures 34, 36, 38 and 40 on the frame. The activator bar 48 is interposed between the longitudinal element 16 of the frame member and longitudinal element 54 of the spacer member. The activator bar is moveable longitudinally toward and away from the transverse element of the frame and includes a front pressure surface 64 or an end member 66 of activator bar 48 for application of finger pressure to effect its movement toward the transverse member. The activator bar moves in an elongated groove 68 (FIGS. 3–4) which is positioned between the longitudinal element 20 of the frame member and the longitudinal element 54 of the spacer member.

Figure 5:
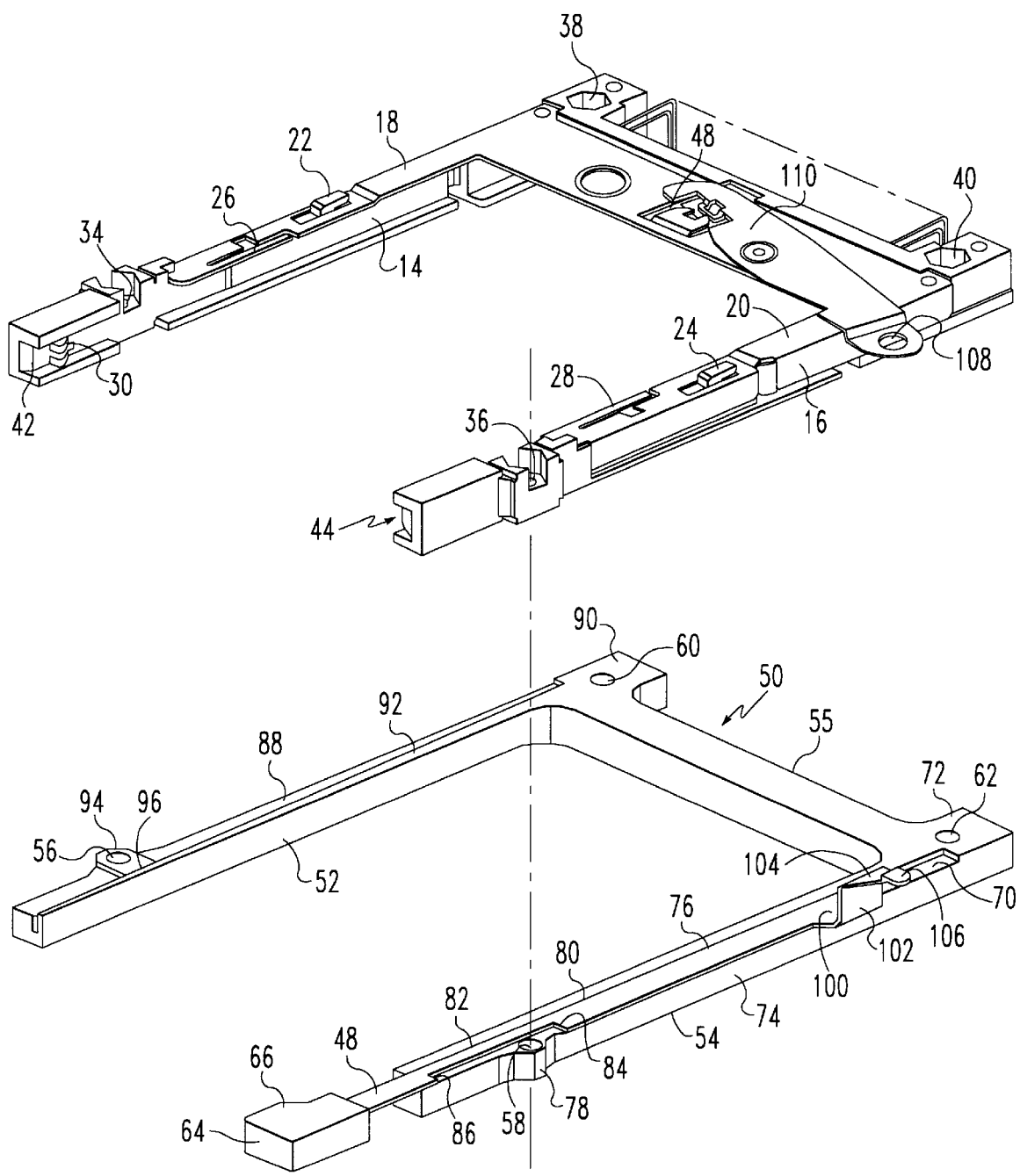
FIG. 5 is an exploded top perspective view of the memory card connector shown in FIG. 1.

Referring particularly to FIG. 5, this groove is formed as a result of a recess 70 on the upper surface 72 of the longitudinal element 54 which extends inwardly from the outer side 74 of longitudinal element 54 to an inner side wall 76. Surrounding aperture 58 there is a fastener retaining member 78. Between this fastener retaining member 78 and inner side wall 76 there is a narrowed segment 80 of recess 70 through which a narrowed segment 82 of the activator bar 48 passes as the activator bar is moved in a forward and rearward longitudinal direction. When the actuator bar is in its rearward position, a front widened section 84 abuts against the fastener retainer member 78. When the actuator bar is in its forward position, a rear widened section 86 abuts against the fastener retainer member 78. Still referring to FIG. 5, it will be noted that there is also a recess 88 on the upper surface 90 of the longitudinal element 52 which extends from the outer side (not shown) of longitudinal element 52 to an inner side wall 92. Surrounding aperture 56 there is a fastener retaining member 94. Between the fastener retaining member 94 and inner side wall 92 there is a narrowed segment 96 of recess 88. Between recess 88 and longitudinal member 14 of the frame member another groove 98 (FIG. 3–4) is formed in which a second actuator bar (not shown) might optionally be mounted. Those skilled in the art will appreciate that a second frame member (not shown) which is essentially similar in construction to frame member 10 might be positioned, for example, beneath spacer member 50 to form a double deck card connector assembly. In such event, a second actuator bar (not shown) having a downwardly and outwardly extending arm might be positioned to be longitudinally moveable in groove 98 to eject a card from that additional card connector.

Figure 6:
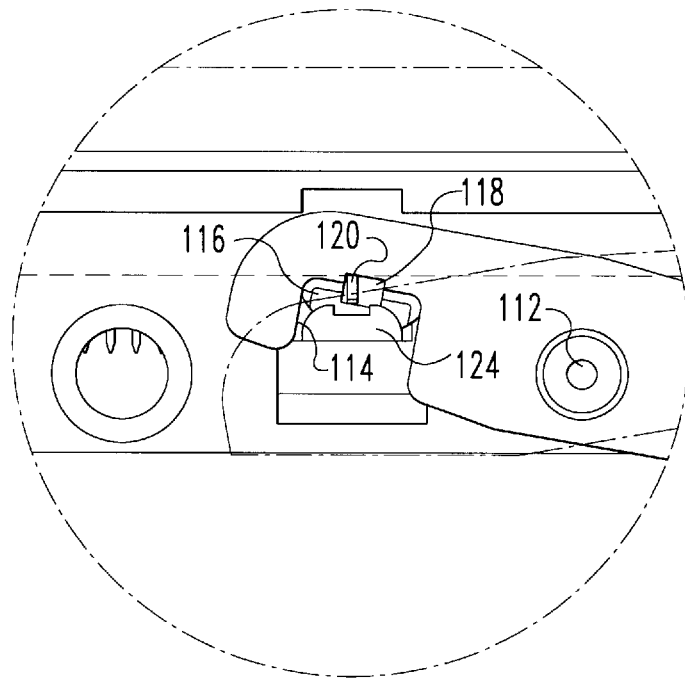
FIG. 6 is an enlarged view of the area within circle VI of FIG. 1.
Figure 10:
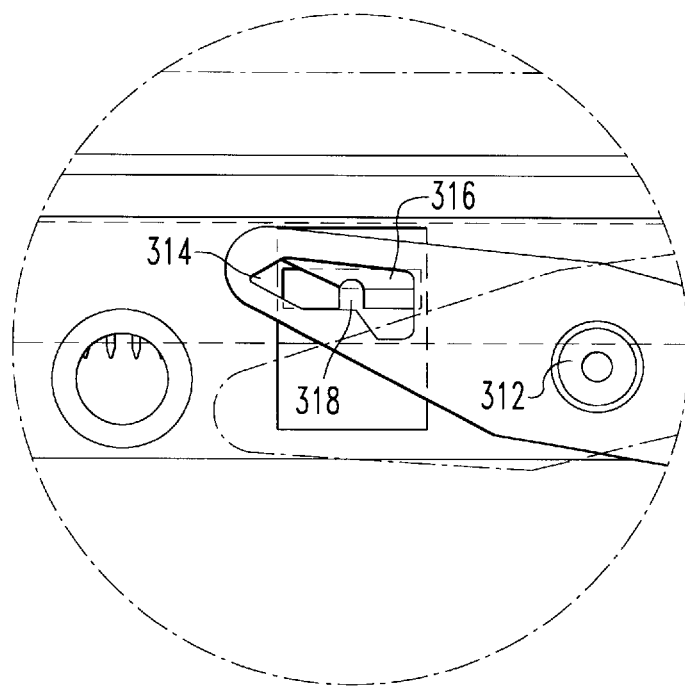
FIG. 10 is a detailed view of the area within circle X in FIG. 7.
Figure 7:
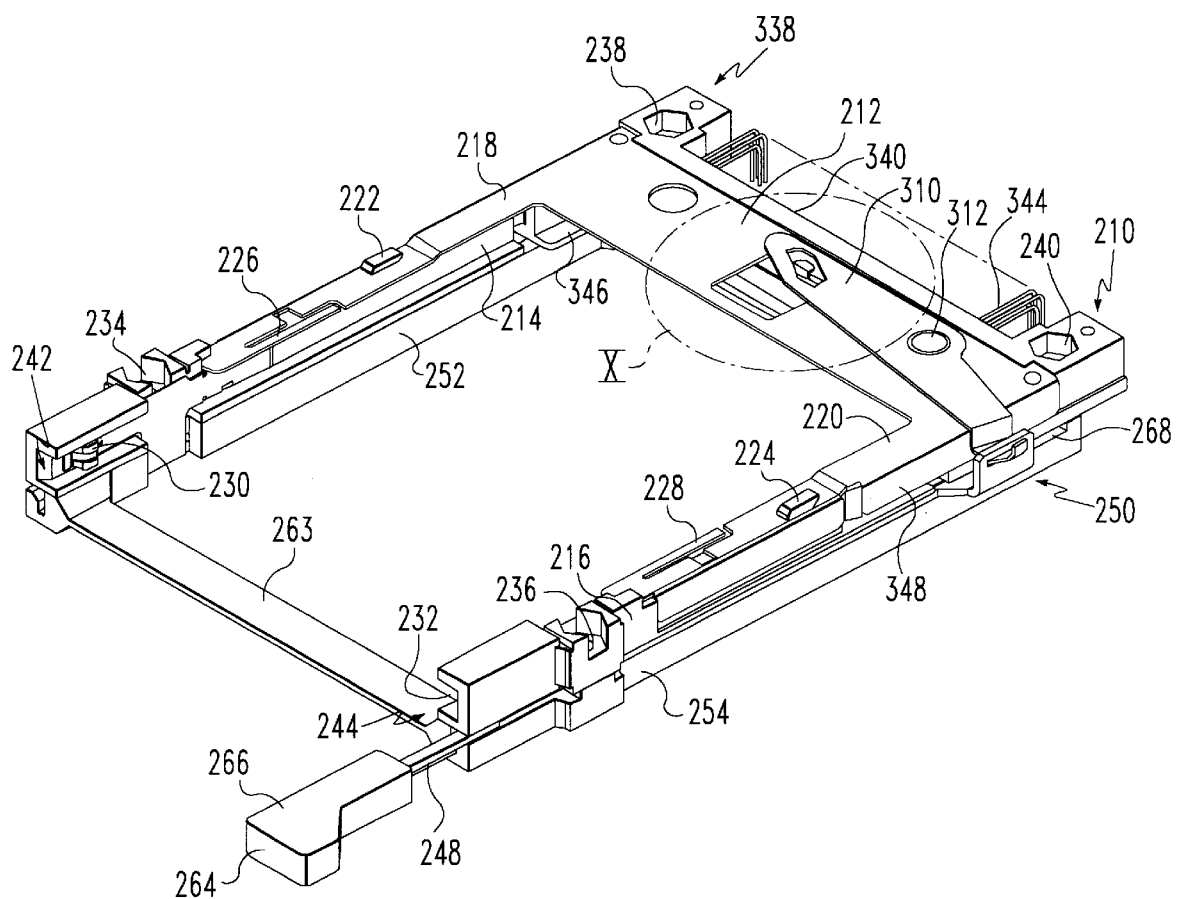
FIG. 7 is a top perspective view of a memory card connector representing an alternate preferred embodiment of the present invention.

Referring to FIGS. 1–6 generally, at its inward terminal end the activator bar is connected by means of an outwardly extending arm 100 an upwardly extending arm 102, an outwardly extending arm 104 and a terminal tab 106 to generally circularly shaped aperture 108 in arm 110. This arm 110 is connected by means of fulcrum pin 112 to the rear transverse element of the frame member and the card engagement plate positioned immediately beneath that rear transverse element. Referring particularly to FIG. 6, it will be seen, as is conventional, that at its opposite end this arm has a recess 114 from which cam projection 116 extends. There is a central aperture 118 in the rear transverse element and a projection 120 extends from the card engagement plate to engage the arm at a point immediately behind the cam projection. Extending upwardly then rearwardly from the card engagement plate there is a cam retaining element 124 which overlaps the cam and allows movement therein. It will be appreciated that when pressure is applied rearwardly to the front pressure surface of the activator bar the arm will pivot on the fulcrum pin and move the card engagement plate forward to displace the card from the connector header. The memory card shown in phantom lines generally at 128 (only in FIG. 1) has a front end 130, a rear end 132 and opposed sides 134 and 136. The connector header is shown generally at numeral 138 and includes a transverse bar 140, front pins as at 142, rear pins as at 144 and opposed side legs 146 and 148.

Referring to FIGS. 7–10, the memory card and connector assembly of the present invention includes a frame member shown generally at numeral 210. This frame member is made up of a metallic rear transverse element 212 and two plastic longitudinal elements 214 and 216. The rear transverse element has metal extensions 218 and 220 which extend perpendicularly therefrom to be connected to the longitudinal elements by means of clips respectively at 222 and 224. On the longitudinal elements 214 and 216 there are also ESD contacts respectively at 226 and 228 and EMI contacts respectively at 230 and 232. There are also front apertures respectively at 234 and 236 through these two longitudinal elements which with rear apertures 238 and 240 in the header as is explained below will be used to connect the assembly to a printed wiring board. There are also side grooves 242 and 244 in the two longitudinal elements which serve to retain the memory card between those elements. It will also be seen that there is also a card engagement plate 246 immediately beneath the rear transverse element of the frame. There is an activator bar 248 which allow longitudinal sliding motion of the activator bar. There is also a spacer member shown generally at 250 over which the frame member 210 is superimposed. The spacer member includes longitudinal elements 252 and 254 which are positioned respectively beneath frame member longitudinal elements 214 and 216 and rear transverse member 255 which is positioned beneath transverse element 212 of the spacer member. The spacer member has vertical apertures 256, 258, 260 and 262 which are aligned respectively with apertures 234, 236, 238 and 240 in the frame member in order to receive fasteners for fixing the frame member to the spacer member. The spacer member also includes front transverse member 263. The activator bar 248 is interposed between the longitudinal element 220 at the frame member and longitudinal element 254 of the spacer member. The activator bar is moveable longitudinally toward and away frame the transverse element of the frame and includes a front pressure surface 264 for application of finger pressure to effect its movement toward the transverse member. The activator bar moves in an elongated groove 268 (FIG. 7) which is positioned between the longitudinal element 220 of the frame member and the longitudinal element 254 of the spacer member.

Figure 8:
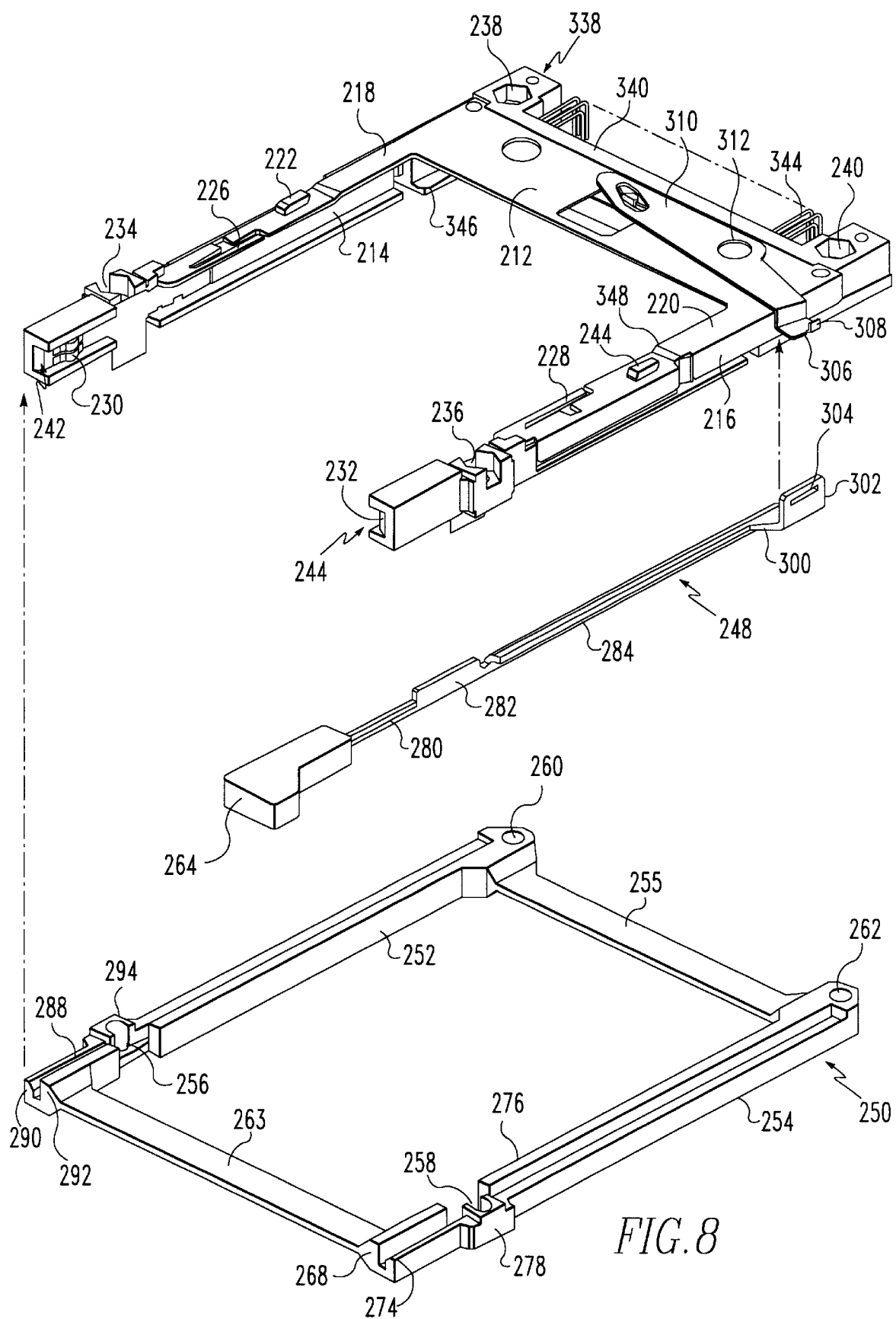
FIG. 8 is an exploded top perspective view of the memory card connector shown in FIG. 7.
Figure 9:
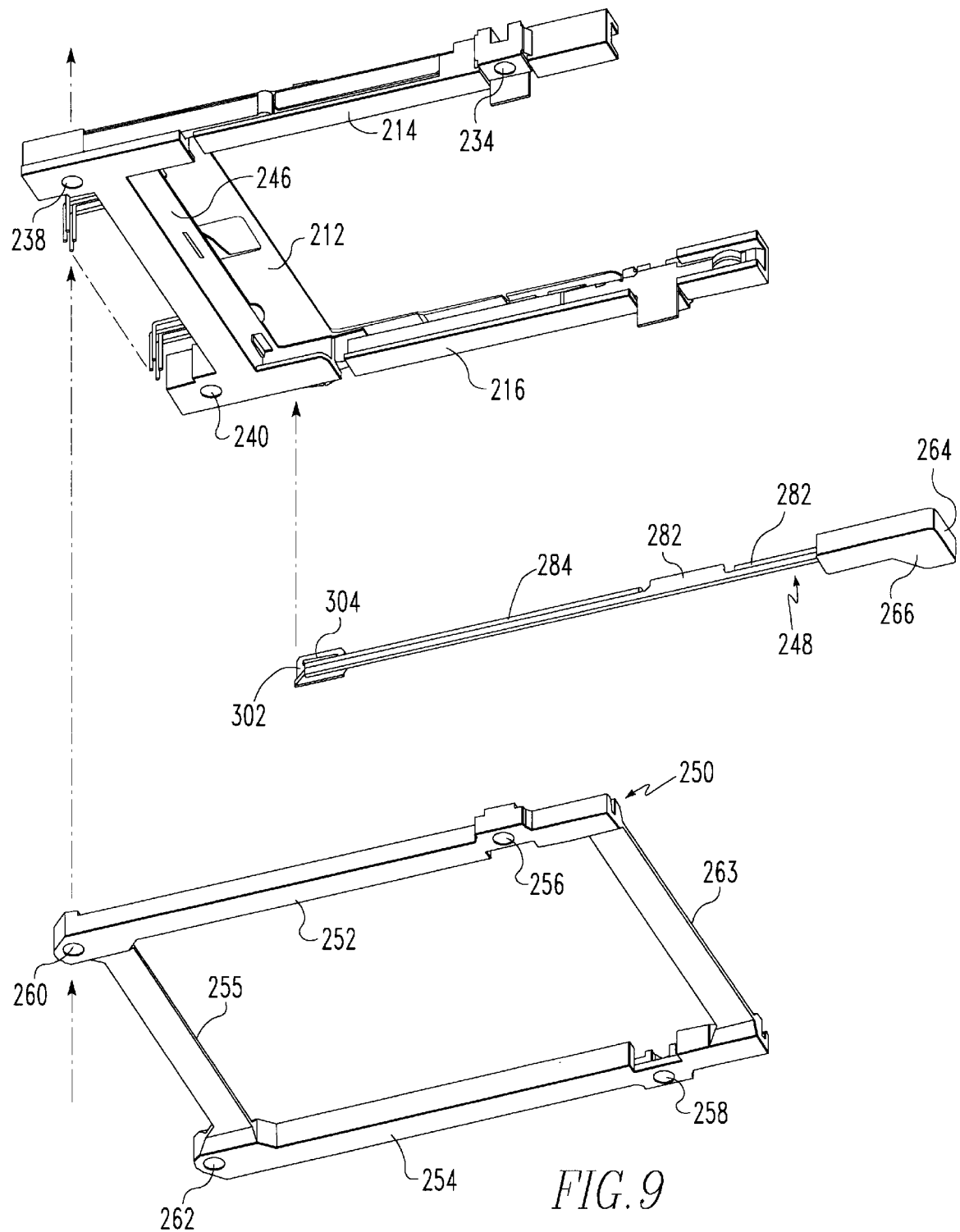
FIG. 9 is an exploded bottom perspective view of the memory card connector shown in FIG. 7.

Referring particularly to FIGS. 8–9, this groove is formed between an outer wall 274 and an inner wall 276 which extend upwardly from longitudinal element 254. Surrounding aperture 258 there is a fastener retaining member 278. When the activator bar is in its rearward position, a horizontal portion 280 of the activator bar is adjacent this fastener retaining member. A narrow, higher vertical section 282 is rearwardly positioned in groove 268. There is an outwardly curved section 284 positioned still further rearwardly. When the actuator bar is in its forward position, the outwardly curved section 284 abuts against the fastener retainer member 278. It will be noted that there is also a groove 288 between outer wall 290 and inner wall 292 of the longitudinal element 252. Surrounding aperture 256 there is a fastener retaining member 294. Those skilled in the art will appreciate that a second frame member (not shown) which is essentially similar in construction to frame member 210 might be positioned, for example, beneath spacer member 250 to form a double deck card connector assembly. In such event, a second actuator bar (not shown) having a downwardly and outwardly extending arm might be positioned to be longitudinally moveable in groove 288 to eject a card from that additional card connector.

Referring to FIGS. 7–10 generally, at its rearward terminal end the activator bar is connected by means of an outwardly extending arm 300 an upwardly extending arm 302 having a slot 304 to an outwardly extending arm 306, and a terminal tab 308 which extends from arm 310. This arm 310 is connected by means of fulcrum pin 312 to the rear transverse element of the frame member and the card engagement plate positioned immediately beneath that rear transverse element. As is conventional, the arm has an oblong aperture 314 through which cam projection 316 extends. This projection overlaps the projection 318 to allow it to move thereunder. It will be appreciated that when pressure is applied rearwardly to the front pressure surface of the activator bar the arm will pivot on the fulcrum pin and move the card engagement plate forward to displace the card from the connector header. The memory card (not shown) will be positioned similarly to the way shown in the first embodiment. The connector header is shown generally at numeral 338 and includes a transverse bar 340, front pins (not shown), rear pins as at 344 and opposed side legs 346 and 348.

It will be appreciated that there has been described an inexpensive and easily manufactured means for decreasing the width of a memory card connector while at the same time still providing for efficient ejection of a memory card.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A connector apparatus for a card-like electronic medium having a width, said connector apparatus comprising:
   (a) a frame member having a rear transverse element and opposed first and second longitudinal elements extending forward from said rear transverse element and spaced at an interval substantially equal to the width of said card-like electronic medium, said first and second opposed longitudinal elements defining a storage space, one end of said frame defining an insertion inlet for inserting the card-like electronic medium into the storage space and said opposed longitudinal elements are positioned in parallel first and second generally vertical longitudinal element planes and said card-like electronic medium is positioned in a generally horizontal electronic medium plane perpendicular to said longitudinal element planes;
   (b) a spacer member comprising spaced opposed first and second longitudinal elements positioned respectively adjacent the first and second longitudinal elements of the frame member in the first and second generally vertical longitudinal element planes;
   (c) a header positioned adjacent the rear transverse element of the frame opposite the insertion inlet;
   (d) an eject plate movably mounted on the frame member and operable to slide away from the header to eject the card-like electronic medium;
   (e) a single link arm pivotally connected to the frame adjacent the header and having an eject plate engagement means for moving the eject plate away from the header to eject the card-like electronic medium;
   (f) an elongated activation means having a front pressure surface and an outwardly extending lateral arm connected to the link arm for pivoting said link arm to move the eject plate away from the header and eject the card-like electronic medium and said activation means being positioned in one of said first generally vertical longitudinal element plane between the first longitudinal element of the frame member and the first longitudinal element of the spacer member; and
   (g) an obstruction means positioned between the first longitudinal element of the frame member and the first longitudinal element of the member for retention of the elongated activation means between the first longitudinal element of the frame member and the first longitudinal element of the spacer member, whereby when pressure is applied rearwardly to the front pressure surface of the elongated activation means, movement of the elongated activation means is caused, so as to pivot the link arm and move the elect plate away from the header to eject the card-like electronic medium.

2. The connector apparatus of claim 1 wherein there is a longitudinal groove in one of the opposed longitudinal elements in the frame member and the elongated activation means is movable in said longitudinal groove.

3. The connector apparatus of claim 1 wherein the lateral arm of the elongated activation means is an upwardly and then outwardly extending arm with a terminal tab and said terminal tab engages a generally circularly shaped aperture in the link arm.

4. The connector apparatus of claim 1 wherein the lateral arm of the elongated activation means is comprised of a first arm which extends outwardly from the elongated activation means and a second arm extends upwardly from the first arm and said second arm has a longitudinal slot which is engaged by a terminal tab on the link arm.

5. The connector apparatus of claim 1 wherein the elongated activation means has a medial narrowed section interposed between a widened front section and a widened rear section and the medial narrowed section is positioned in inward adjacent relation to the obstruction means to allow only limited movement of the activation means.

6. The connector apparatus of claim 1 wherein the eject plate is movably mounted on the frame and operable to slide both toward the header to allow engagement of the card-like electronic medium from the header and away from the header to eject the card-like electronic medium.

7. The connector apparatus of claim 6 wherein the link arm has a first contact means where the link arm is engaged by the eject plate at a first contact means when the eject plate and the card-like electronic medium are being moved toward the header and a second contact means where the link arm engages the eject plate when the card-like electronic medium is ejected.

8. A connector apparatus for a car-like electronic medium, having a width said connector apparatus comprising:

(a) a frame member having a rear transverse element and parallel spaced opposed first and second longitudinal elements extending forward from said rear transverse element and spaced at an interval substantially equal to the width of said card-like electronic medium, said opposed longitudinal elements defining a storage space and wherein one end of said frame defines an insertion inlet for inserting the card-like electronic medium into the storage space;

(b) a spacer member having parallel spaced opposed first and second longitudinal elements position respectively beneath the first and second longitudinal elements of the frame member;

(c) a header positioned adjacent the rear transverse element of the frame opposite the insertion inlet;

(d) an eject plate movably mounted on the frame member and operable to slide away from the header to eject the card-like electronic medium;

(e) a single link arm pivotally connected to the frame adjacent the header and having an eject plate engagement means for moving the eject plate away from the header to eject the card-like electronic medium;

(f) an elongated activation means having a front pressure surface and an outwardly extending lateral arm connected to the link arm for pivoting said link arm to move the eject plate away from the header and eject the card-like electronic medium, wherein said elongated activation means is positioned between the first longitudinal element of the frame member and the first longitudinal element of the spacer member; and (g) an obstruction means positioned between the first longitudinal element of the frame member and the first longitudinal member of the spacer element for retention of the elongated activation means between the first longitudinal element of the frame member and the first longitudinal element if the spacer member, whereby when pressure is applied rearwardly to the front pressure surface of the elongated activation means, movement of the elongated activation means is caused, so as to pivot the link arm and move the eject plate away from the header to eject the card-like electronic medium.

9. The connector of claim 8 wherein the elongated activation has a medial narrowed section interposed between a widened front section and a widened rear section and the medial section is positioned in inward adjacent relation to the obstruction means to allow only limited movement of the elongated activation means.

* * * * *